United States Patent [19]
Granger

[11] 3,992,877
[45] Nov. 23, 1976

[54] COMBUSTION GAS PRESSURE GENERATOR

[76] Inventor: Charles C. Granger, 1203 Chestnut St., Henderson, N.C. 27536

[22] Filed: Mar. 10, 1975

[21] Appl. No.: 556,864

[52] U.S. Cl. ............................. 60/39.68; 60/39.71; 60/39.8
[51] Int. Cl.² ..................... F02C 5/12; F02C 7/22
[58] Field of Search............ 60/39.68, 39.71, 39.76, 60/39.78, 39.79, 39.8, 39.81, 39.6–39.63, 39.67; 431/222, 227, 208, DIG. 68, DIG. 69, DIG. 104, 223–226, 228, 229

[56] References Cited
UNITED STATES PATENTS

| | | | |
|---|---|---|---|
| 1,074,209 | 10/1913 | Roy | 60/39.68 |
| 1,112,844 | 10/1914 | Schnitter | 60/39.68 |
| 1,302,138 | 4/1919 | Cooper | 60/39.68 |
| 1,601,248 | 9/1926 | Gillespie et al. | 60/39.68 |
| 1,630,940 | 5/1927 | Hoffman | 431/DIG. 68 |
| 1,713,709 | 5/1929 | Moon | 60/39.68 |
| 1,968,360 | 7/1934 | Sturgis | 431/208 |
| 2,532,831 | 12/1950 | Breese | 60/39.71 |
| 2,647,567 | 8/1953 | Ciglia | 431/DIG. 68 |
| 3,867,812 | 2/1975 | Van Arsdel | 60/39.68 |

FOREIGN PATENTS OR APPLICATIONS

| | | | |
|---|---|---|---|
| 821,830 | 12/1937 | France | 60/39.68 |

Primary Examiner—Carlton R. Croyle
Assistant Examiner—Robert E. Garrett
Attorney, Agent, or Firm—Clarence A. O'Brien; Harvey B. Jacobson

[57] ABSTRACT

A closed pressure housing is provided having an internal partition dividing the interior of the housing into first and second chambers. The first chamber includes a pressurized gas inlet and a liquid fuel reservoir is disposed within and opens into the interior of the first chamber. Fuel supply means is provided for supplying liquid fuel under pressure to the fuel reservoir and structure is operatively associated with the fuel reservoir for heating the latter and vaporizing the liquid fuel therein. A combustion gas transfer passage communicates the first and second chambers and is controlled by a check valve and ignition means is provided within the first chamber for igniting a combustible mixture of pressurized gas and vaporized fuel within the first chamber. Finally, the second chamber includes a combustion gas outlet and the effective flow rate of the combustion gas outlet is less than the effective flow rate of the gas pressure transfer passage. Accordingly, the second chamber acts as a pressure accumulator for modulating pressure pulses discharged through the transfer passage from the first chamber into the second chamber and a reasonably high pressure of combustion gases is maintained within the second chamber, even though the combustion of gas and vaporized fuel within the first chamber occurs intermittently.

3 Claims, 1 Drawing Figure

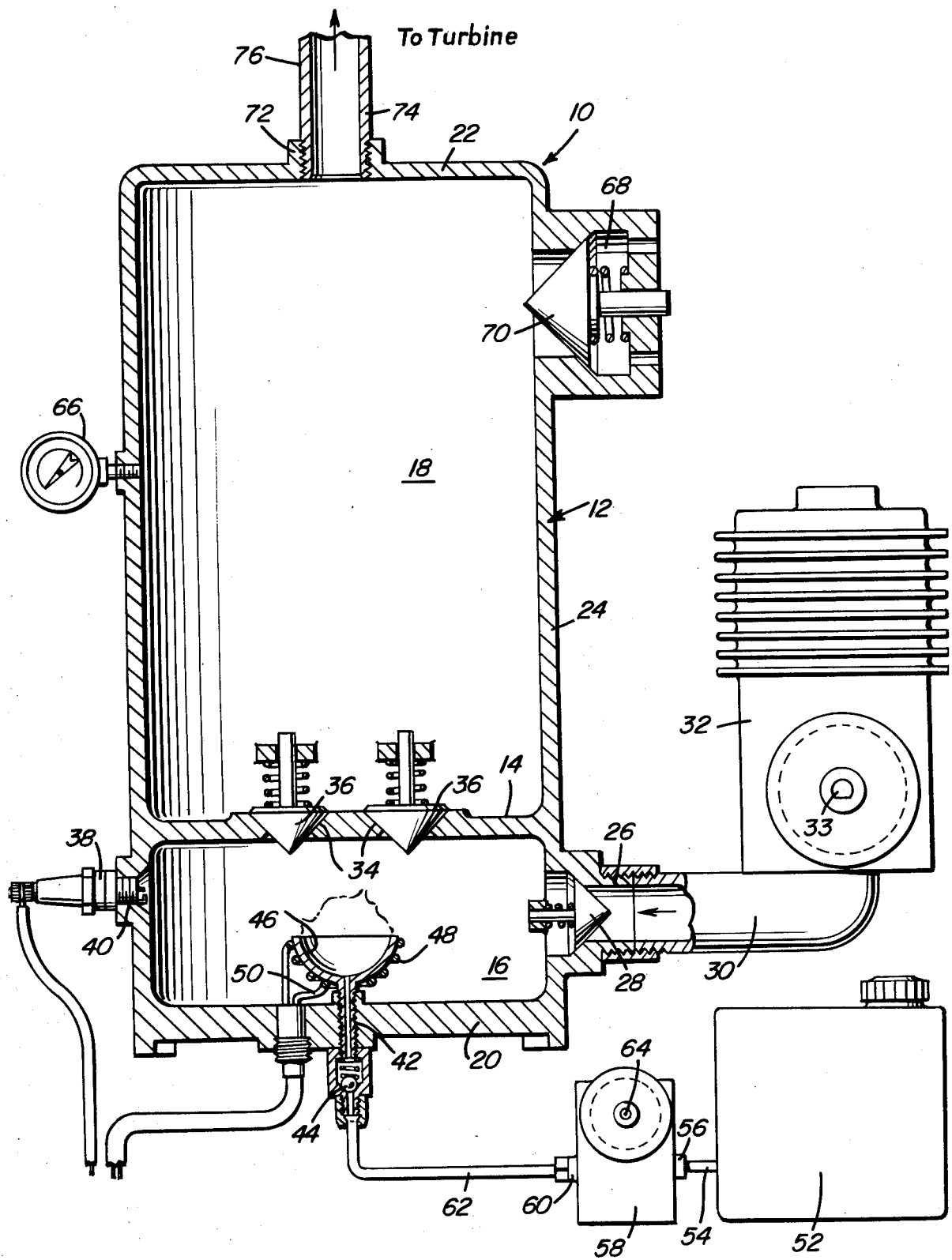

COMBUSTION GAS PRESSURE GENERATOR

BACKGROUND OF THE INVENTION

Various forms of gas pressure generators have been heretofore designed and many have been constructed in a manner so as to provide a sufficient supply of combustion gas under pressure to drive various types of expansion and rotary engines.

However, most of these previously designed combustion gas pressure generators have been either excessively complex in construction or have had various operating drawbacks. Examples of previously patented gas generators including some of the structural features of the instant invention are disclosed in U.S. Pat. Nos. 989,923; 1,074,209; 1,165,023; 1,239,519; 1,288,940; 1,601,248; 1,605,773; 3,407,594 and 3,811,271.

BRIEF DESCRIPTION OF THE INVENTION

The combustion gas pressure generator of the instant invention is constructed in a manner whereby a successively firing combustion chamber discharges the exhaust gases generated therein through a check valve controlled passage into a second pressure accumulator chamber having an outlet therefor with an effective flow rate of less than the effective flow rate of the check valve controlled passage through which combustion gases are discharged from the first chamber into the second chamber.

The second chamber includes a relief valve controlled excess pressure outlet and novel structure is provided within the first chamber for vaporizing liquid fuel therein, the first chamber also being provided with compressed air inlet means whereby an extremely combustible air and fuel mixture may be formed between the pressurized air discharged into the first chamber and the liquid fuel vaporized in the first chamber.

The main object of this invention is to provide an apparatus whereby high pressure gases of substantially constant pressure may be developed for use in powering an expansion or turbine engine.

Another object of this invention is to provide a gas pressure generator in accordance with the preceding objects and constructed in a manner whereby its effective operation will be highly dependable.

Another important object of this invention is to provide a gas pressure generator including novel means for vaporizing liquid fuel within the combustion chamber of the generator in a substantially constant manner and for intermittent mixing with air introduced into the combustion chamber through a check valve controlled inlet in a cyclic manner.

A final object of this invention to be specifically enumerated herein is to provide a combustion gas pressure generator in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

The single view of the drawing illustrates the combustion gas pressure generator in side elevation and with portions of the housing of the generator and air inlet therefore being broken away and illustrated in vertical section.

DETAILED DESCRIPTION OF THE INVENTION

Referring now more specifically to the drawings, the numeral 10 generally designates the combustion gas pressure generator of the instant invention. The generator 10 includes a closed pressure housing referred to in general by the reference numeral 12 and it may be seen from the drawing that the housing 12 is vertically elongated and includes a generally horizontal partition 14 in its lower portion dividing the interior of the housing 12 into a first lower chamber 16 and a second upper chamber 18. The lower extremity of the chamber 16 is defined by a lower wall 20 of the housing 12 and the upper extremity of the upper chamber 18 is defined by an upper wall 22 of the housing 12, the housing 12 including upstanding peripheral side walls 24 extending between the upper wall 22 and the lower wall 20 and across which the partition 14 is secured.

One lower side wall portion of the housing 12 includes an air inlet 26 opening into the lower chamber 16 and controlled by a spring-biased check valve 28. The discharge pipe 30 of an air compressor 32 is sealingly coupled to the air inlet 26 and the air compressor 32 includes a rotatable power input shaft 33 to be hereinafter again referred to.

The partition 14 includes a pair of transfer ports 34 opening therethrough under the control of spring-biased check valves 36 and the transfer ports 34 communicate the chamber 16 with the chamber 18.

A conventional igniter or spark plug 38 is threadedly secured into a bore 40 formed in the side wall portion of the housing 12 remote from the air inlet 26 and opening into the chamber 16. Also, the lower wall 20 includes a liquid fuel inlet 42 opening therethrough under the control of a check valve 44. The portion of the inlet 42 which opens into the chamber 16 opens into the bottom of an upwardly opening cup-shaped reservoir 46 having electrical resistance heating coils 48 disposed thereabout and the open upper portion of the reservoir 46 is aligned with the air inlet 26, the spark plug 30 also being generally aligned with the inlet 26 on the side of the reservoir 46 remote from the inlet 26. Suitable electrical potential is supplied to the heating coils 48 through conductors 50 which are insulatively secured through the lower wall 20.

A liquid fuel tank 52 is provided and includes an outlet 54 communicated with the inlet 56 of a fuel pump 58 and the fuel pump 58 includes an outlet 60 communicated with the liquid fuel inlet 42 by means of a tubular line 62. The fuel pump 58 includes a rotatable power input shaft 64.

A pressure gauge 66 is supported from the housing 12 and opens into the second upper chamber 18. In addition, the upper portion of the housing 12 includes an access gas pressure outlet 68 under the control of a pressure relief valve 70 and the upper wall 22 of the housing 12 includes a gas pressure outlet 72 with which the inlet end 74 of a gas pressure supply line or pipe 76 is communicated.

It will be noted that the supply line or pipe 76 may extend to the pressure inlet of a turbine or a displacement type expansion engine and that the turbine or engine will include a power output shaft which may be operatively coupled to the input shafts 33 and 64 of the air pump 32 and fuel pump 58. Further, the air pump 32 may be of the positive displacement type and driven in timed sequence with rotation of the power output shaft of the associated turbine or engine. Likewise, the input shaft 64 may also be driven in timed sequence with the associated turbine or expansion engine output shafts. Finally, the igniter or spark plug 38 may be under the control of a distributor type mechanism driven by the turbine or expansion engine to which gas pressures are piped by the line 76.

In addition to the air compressor 32 being of the positive displacement type, it may be of the type operative to discharge succesive pulses of air under pressure therefrom. Further, the fuel pump 58 may be of the same type whereby successive measured quantities of fuel may be discharged into the cup-shaped reservoir 46 for vaporizing therein in timed sequence with the discharge of a pulse of air under pressure from the compressor 32 into the chamber 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A combination gas pressure generator comprising an upstanding vertically elongated hollow closed pressure housing having an internal generally horizontal partition dividing the interior of said housing into first and second lower and upper chambers, said first chamber including a horizontally inwardly opening pressurized gas inlet, an upwardly opening liquid fuel reservoir within said first chamber and including check valve controlled liquid fuel inlet means opening upwardly into a lower portion of the interior of said reservoir, fuel supply means operative to supply liquid fuel under pressure to said fuel inlet means, the open top of said reservoir being generally aligned with said pressurized gas inlet, ignition means in said first chamber and also positioned in general alignment with said pressurized gas pressure inlet on the side of said reservoir remote from said pressurized gas pressure inlet, said partition including check valve controlled gas pressure transfer ports communicating said first chamber with said second chamber, said second chamber including upwardly and outwardly opening combustion gas outlet means opening through the upper end of said housing, the effective flow rate of said gas outlet means being less than the effective flow rate of said gas pressure transfer means, said gas inlet for said first chamber including check valve means operative to prevent reverse flow of gas outwardly of said inlet, and heating means operatively associated with said receptacle for heating the latter to an extent operative to vaporize fuel supplied to said reservoir.

2. The combination of claim 1 wherein said heating means comprises electrical resistance heating means.

3. The combination of claim 1 wherein said second chamber includes a relief valve controlled excess gas pressure outlet.

* * * * *